(12) United States Patent
Van Der Brug et al.

(10) Patent No.: US 9,220,152 B2
(45) Date of Patent: Dec. 22, 2015

(54) METHODS AND APPARATUS FOR COMMUNICATION OVER A THREE-PHASE POWER SYSTEM UTILIZING A COMMUNICATION PROTOCOL

(71) Applicant: Koninklijke Philips Electronics N.V., Eindhoven (NL)

(72) Inventors: Willem Peter Van Der Brug, Best (NL); Cornelis Antonius Verbakel, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 500 days.

(21) Appl. No.: 13/755,122

(22) Filed: Jan. 31, 2013

(65) Prior Publication Data

US 2013/0141015 A1    Jun. 6, 2013

Related U.S. Application Data

(63) Continuation-in-part of application No. PCT/IB2012/055615, filed on Oct. 16, 2012.

(60) Provisional application No. 61/551,227, filed on Oct. 25, 2011.

(51) Int. Cl.
*H05B 37/02* (2006.01)
*H05B 33/08* (2006.01)

(52) U.S. Cl.
CPC ............ *H05B 37/02* (2013.01); *H05B 37/0263* (2013.01); *H05B 33/0845* (2013.01)

(58) Field of Classification Search
USPC ............................. 307/17, 84; 315/210, 297
See application file for complete search history.

(56) References Cited

U.S. PATENT DOCUMENTS

| | | | |
|---|---|---|---|
| 5,264,823 A | 11/1993 | Stevens | |
| 5,471,119 A | 11/1995 | Ranganath et al. | |
| 5,614,811 A | 3/1997 | Sagalovich et al. | |
| 6,218,787 B1 | 4/2001 | Murchko et al. | |
| 6,842,668 B2 * | 1/2005 | Carson et al. | 700/286 |
| 2004/0155603 A1 * | 8/2004 | Clegg | 315/291 |
| 2010/0277102 A1 | 11/2010 | Lin et al. | |

OTHER PUBLICATIONS

MHT Induction Lighting; "Dimming & Smart Controls", May 26, 2011, http://www.mhtlighting.com/featured-benefits/dimming-smart-controls/.
David Nicholas et at; "Modelling and Developing an Intelligent Road Lighting System Using Power-Line Communication", East Lancashire Institute, School of Science and Technology, Blackburn, UK, pp. 1-3.

* cited by examiner

*Primary Examiner* — Danny Nguyen
(74) *Attorney, Agent, or Firm* — Meenakshy Chakravorty

(57) ABSTRACT

Methods and apparatus related to controlling an apparatus such as a lighting fixture utilizing a communication protocol transmitted over the power line that feeds the lighting fixture. For example, in some embodiments data is transmitted over a three-phase power system via switching of a transformer electrically coupled to the three-phase power system. Optionally, a single transformer may be utilized to transmit data to at least on apparatus coupled to a first phase line of a three-phase power system and to at least one apparatus coupled to a second phase line of the three-phase power system.

23 Claims, 4 Drawing Sheets

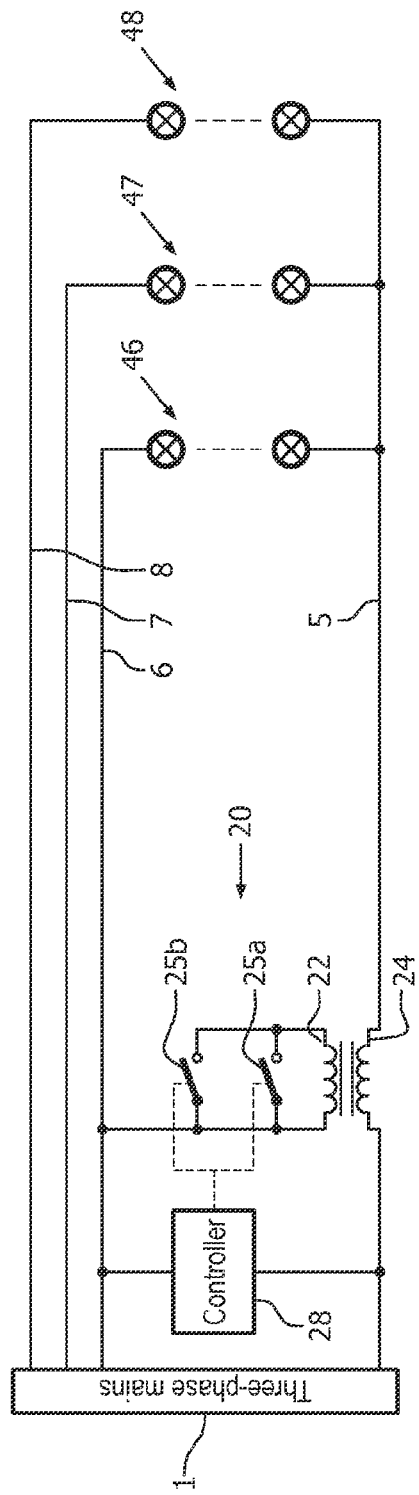
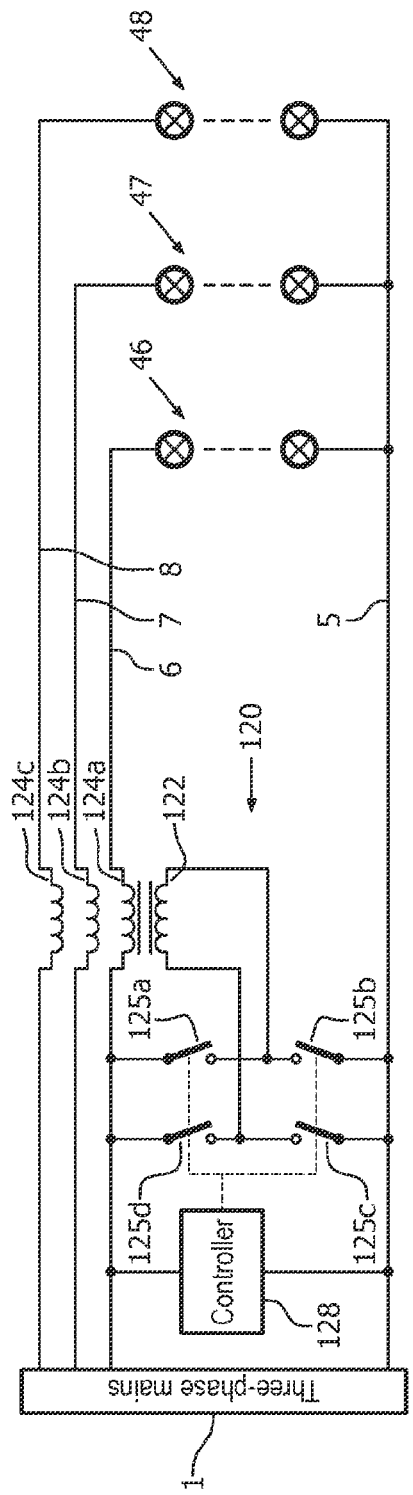
FIG. 1
FIG. 2

METHODS AND APPARATUS FOR COMMUNICATION OVER A THREE-PHASE POWER SYSTEM UTILIZING A COMMUNICATION PROTOCOL

TECHNICAL FIELD

The present invention is directed generally to control of an apparatus connected to a three-phase power system. More particularly, various inventive methods and apparatus disclosed herein relate to controlling an apparatus such as a lighting fixture utilizing a communication protocol transmitted over the three-phase power system that feeds the lighting fixture.

BACKGROUND

Lighting fixtures have been designed that are capable of receiving control signals for controlling one or more aspects thereof. For example, some lighting fixtures receive control signals that may at least selectively dictate the dimming levels of such lighting fixtures.

One existing solution for transmitting such control signals utilizes one or more stand-alone control wires that extend from a controller to the lighting fixtures. Data packets are then sent over the control wires to control the lighting fixtures. The data packets and communications may conform to a communications protocol such as DMX or DALI. Implementation of such a solution may have one or more drawbacks. For example, such a solution requires the running of one or more separate wires and involves limitations on wiring length and/or wiring method that may not be appropriate for certain applications such as street lighting.

Other existing solutions enable transmitting such control signals without installing new wires. For example, some solutions utilize wireless control signals or communications over the power wires (PLC). However, implementation of such solutions may have one or more drawbacks. For example, such solutions require specific hardware modems and/or radios to be installed at each individual lighting fixture. Such specific equipment is often overly costly and/or may not be easily installed in existing lighting fixtures or light poles supporting lighting fixtures.

Thus, there is a need in the art to provide methods and apparatus for controlling an apparatus connected to a three-phase power system utilizing a communication protocol transmitted over the three-phase power system that feeds the lighting fixture.

SUMMARY

The present disclosure is directed to inventive methods and apparatus related to controlling an apparatus such as a lighting fixture utilizing a communication protocol transmitted over the power line that feeds the lighting fixture. In some embodiments amplitude modulation of the mains AC power is used for such communication. For example, in some embodiments data is transmitted over a three-phase power system via switching of a transformer electrically coupled to the three-phase power system. Optionally, a single transformer may be utilized to transmit data to at least one apparatus coupled to a first phase line of a three-phase power system, to at least on apparatus coupled to a second phase line of the three-phase power system, and/or to at least one apparatus coupled to a third phase line of the three-phase power system. Also, for example, in some embodiments data is received at a lighting fixture via receiving an encoded voltage and comparing the voltage level of a plurality of partial or full sine cycles of the voltage to determine an incoming data packet. One or more aspects of the lighting fixture may be controlled based on the received data. Optionally, in some embodiments the communication protocol may be a unidirectional communication protocol. Also, optionally, in some embodiments the communication protocol may be additionally or alternatively utilized to control non-lighting fixture devices.

Generally, in one aspect, a method of transmitting a data packet to a lighting fixture network over a three-phase power system via manipulation of a single transformer coupled to the three-phase power system is provided and includes the steps of: identifying a lighting fixture data packet, the lighting fixture data packet based on data indicative of appropriate lighting fixture settings for one or more lighting fixtures of a lighting fixture network; and switching a single transformer electrically coupled to a three-phase power system during a plurality of cycle periods, the three-phase power system including a first phase line, a second phase line, a third phase line, and a neutral line. Switching the single transformer causes one of a voltage drop and a voltage rise measurable between each of: the first phase line and the neutral line, the second phase line and the neutral line, and the third phase line and the neutral line. Switching the single transformer is done in correspondence with the data packet such that the at least one of the voltage drop and the voltage rise correspond to the data packet.

In some embodiments switching of the transformer occurs at a first phase during a first set of the cycle periods and occurs at a second phase during a second set of the cycle periods. In some versions of those embodiments the first phase and the second phase have a phase difference of approximately one-hundred and twenty degrees. In some embodiments switching of the transformer occurs at a third phase during a third set of the cycle periods and the second phase and the third phase have a phase difference of approximately one-hundred and twenty degrees.

In some embodiments the transformer is connected in series with the neutral line of the three-phase power system.

In some embodiments the transformer includes: a first secondary winding connected in series with the first phase line; a second secondary winding connected in series with the second phase line; and a third secondary winding connected in series with the third phase line.

In some embodiments a sum of current through the transformer is substantially zero and the three-phase power system is substantially balanced.

In some embodiments the data indicative of appropriate lighting fixture settings is stored in a memory.

In some embodiments the data indicative of appropriate lighting fixture settings is based on data received from at least one sensor.

In some embodiments the at least one of the voltage drop and the voltage rise is less than four volts.

In some embodiments the cycle periods consist of half-sine cycle periods.

Generally, in another aspect, a method of determining data packet information transmitted over a three-phase power system and controlling a lighting fixture based on the data packet information is provided and includes the steps of: receiving, at a first controller, a first input power waveform over a first phase line and a neutral line of a three-phase power system; comparing, at the first controller, a voltage level of a plurality of first sine cycle periods of the first input power waveform; determining, at the first controller, an incoming data packet based on which of the first sine cycle periods have a reduced voltage level and which have a non-reduced voltage level; controlling, via the first controller, at least one aspect of a first lighting fixture based on the incoming data packet received over the first input power waveform, the first lighting fixture electrically powered by the first input power waveform; receiving, at a second controller, a second input power waveform over a second phase line and the neutral line of the three-phase power system; comparing, at the second controller, a voltage level of a plurality of second sine cycle periods of the second input power waveform, wherein the receiving of the second sine cycle periods of the second input power waveform overlaps in time with the receiving of the first sine cycle periods of the first input power waveform; wherein the difference between the reduced voltage level and the non-reduced voltage level in the second sine cycle periods is approximately half of the difference between the reduced voltage level and the non-reduced voltage level in the first sine cycle periods.

In some embodiments the difference between the reduced voltage level and the non-reduced voltage level in the second sine cycle periods is less than two volts.

In some embodiments a dimming level of the first lighting fixture and the second lighting fixture is controlled based on the incoming data packet.

In some embodiments the sine cycle periods include half-sine cycles.

In some embodiments the method further includes the steps of: comparing, at the first controller, a voltage level of a plurality of additional first sine cycle periods of the first input power waveform; comparing, at the second controller, a voltage level of a plurality of additional second sine cycle periods of the second input power waveform, wherein the receiving of the additional second sine cycle periods of the second input power waveform overlaps in time with the receiving of the additional first sine cycle periods of the first input power waveform; determining, at the second controller, the incoming data packet based on which of the additional second sine cycle periods have a reduced voltage level and which have a non-reduced voltage level; and controlling, via the second controller, at least one aspect of a second lighting fixture based on the incoming data packet received over the second input power waveform, the second lighting fixture electrically powered by the second input power waveform; wherein the difference between the reduced voltage level and the non-reduced voltage level in the additional first sine cycle periods is approximately half of the difference between the reduced voltage level and the non-reduced voltage level in the additional second sine cycle periods.

In some embodiments the method further includes determining, at the second controller, the incoming data packet based on which of the second sine cycle periods have a reduced voltage level and which have a non-reduced voltage level; and controlling, via the second controller, at least one aspect of a second lighting fixture based on the incoming data packet received over the second input power waveform, the second lighting fixture electrically powered by the second input power waveform.

Generally, in another aspect, a method of implementing a communication system in a three-phase power system includes the steps of: electrically coupling a single transformer to at least one line of a three-phase power system, the three-phase power system including a neutral line and three phase lines, at least one phase line of the three phase lines feeding a lighting fixture network, the single transformer selectively causing a voltage alteration recognizable in connections with each of the three phase lines of the three-phase power system during a plurality of sine cycle periods in correspondence with an informational data packet.

In some embodiments the method further includes the step of implementing software in a controller of a ballast in at least one lighting fixture of the lighting fixture network, the ballast being coupled to the one phase line and the neutral; wherein the controller monitors voltage over the one phase line and the neutral; wherein the software determines an incoming data packet based on which of the sine cycle periods have the voltage alteration; and wherein the controller controls one or more aspect of the lighting fixture based on the incoming data packet.

In some embodiments the single transformer is connected in series with the neutral line of the three-phase power system.

In some embodiments the single transformer includes: a first secondary winding connected in series with the first phase line; a second secondary winding connected in series with the second phase line; and a third secondary winding connected in series with the third phase line.

As used herein for purposes of the present disclosure, the term "light-emitting diode" or "LED" should be understood to include any electroluminescent diode or other type of carrier injection/junction-based system that is capable of generating radiation in response to an electric signal.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s).

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection).

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 1 illustrates a schematic of a single communications transformer placed in series with a neutral line of a three-phase power system. The communications transformer and the three-phase power system supply three different groups of lighting fixtures.

FIG. 2 illustrates a schematic of a single communications transformer having three separate secondary windings, with each of the secondary windings placed in series with one of the phase lines line of a three-phase power system. The communications transformer and the three-phase power system supply three different groups of lighting fixtures.

DETAILED DESCRIPTION

Figure 3:
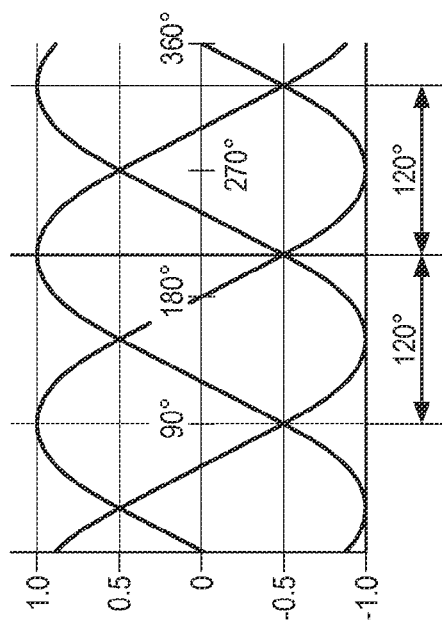
FIG. 3 illustrates the voltage and current with respect to time for one cycle of a three-phase power system.

Lighting fixture control systems have been designed that utilize control signals for controlling one or more aspects of a lighting fixture. For example, some lighting fixtures are capable of receiving generated data packets that are transmitted over one or more stand alone control wires that extend from a controller to the lighting fixtures. The data packets and communications may conform to a communications protocol such as DMX or DALI. However, such a solution requires the running of separate wires and involves limitations on wiring configuration that may not be appropriate for certain applications such as street lighting. Other existing solutions enable transmitting such control signals without installing new wires. However, such solutions may have one or more drawbacks such as requiring specific hardware modems and/or radios to be installed at each individual lighting fixture, which is often overly costly and/or may not be suited for existing lighting fixtures.

Thus, Applicants have recognized a need to provide methods and apparatus for controlling an apparatus connected to a three-phase power system utilizing a communication protocol transmitted over the three-phase power system that feeds the lighting fixture and that optionally does not require multiple transformers to be installed.

More generally, Applicants have recognized and appreciated that it would be beneficial to provide methods and apparatus for controlling an apparatus such as a lighting fixture utilizing a communication protocol transmitted over the three-phase power system that feeds the lighting fixture.

In view of the foregoing, various embodiments and implementations of the present invention are directed to control of an apparatus connected to a three-phase power system.

In the following detailed description, for purposes of explanation and not limitation, representative embodiments disclosing specific details are set forth in order to provide a thorough understanding of the claimed invention. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatus and methods may be omitted so as to not obscure the description of the representative embodiments. Such methods and apparatus are clearly within the scope of the claimed invention. For example, various embodiments of the approach disclosed herein are particularly suited for adjusting the dimming level of a street lighting fixture in a street lighting network. Accordingly, for illustrative purposes, the claimed invention may be discussed in conjunction with such street lighting network. However, other configurations and applications of this approach are contemplated without deviating from the scope or spirit of the claimed invention. For example, in some applications the approach may be implemented in an indoor lighting environment such as controlling a plurality of indoor lighting fixtures in an office environment.

Referring to FIG. 1, in one embodiment, a communications transformer 20 is placed in series with a neutral line 5 of a three-phase mains power supply 1. The three-phase mains power supply 1 also includes a first phase line 6, a second phase line 7, and a third phase line 8. The communications transformer 20 may be downstream of a transformer of the mains power supply 1 that feeds a distribution panel. Any provided mains supply transformer and distribution panel may provide protection, routing, and/or switching of output that is supplied over phase lines 6, 7, 8 and neutral line 5 to respective of lighting fixture groups 46, 47, 48.

The communications transformer 20 includes a secondary winding 24 in series with the neutral line 5 and a primary winding 22 coupled to the first phase line 6 and inductively coupled with the secondary winding 24. In some embodiments the primary winding 22 may alternatively be coupled to the second phase line 7 or the third phase line 8. The primary winding 24 includes a plurality of electronically actuable switches 25a, 25b that may be selectively activated to alter the state of the communications transformer 20. When switch 25b is closed and switch 25a is open, the transformer 20 is switched on and a voltage is added to the neutral line 5. In some embodiments the added voltage may be approximately one volt. Adding a voltage to the neutral line 5 will result in a decreased voltage being supplied to each of lighting fixture groups 46, 47, 48 as the voltage differential between each of phase lines 6, 7, 8 and neutral line 5 is decreased upon adding voltage to the neutral line 5. In some embodiments the transformer 20 may additionally or alternatively be configured to decrease the voltage on the neutral line 5 (e.g., by changing the primary winding to secondary winding ratio, by changing the polarity of the connection of transformer 20). When switch 25a is also closed, the transformer 20 is short circuited and no voltage is added to neutral line 5 and when switch 25b is closed voltage will be added. In some embodiments the switch 25a may be omitted. In such embodiments, when the switch 25b is opened no voltage will be added to the neutral line 5. Also, in some of those embodiments where the switch 25a is omitted, the transformer 20 may saturate and form a nonlinear series impedance when the switch 25b is opened.

A controller 28 is also illustrated in FIG. 1 that is electrically coupled to the switches 25a, 25b and that is electrically coupled to the first phase line 6 and the neutral line 5. The electrical coupling of the controller 28 to the switches 25a and 25b is illustrated by dotted lines in FIG. 1. In some embodiments the controller 28 may alternatively be coupled to the neutral line 5 and the second phase line 7 or the third phase line 8. The controller 28 selectively activates at least one of the switches 25a, 25b as described herein to encode a communications data packet in the output voltage supplied to each of lighting fixture groups 46, 47, 48. For example, in order to transmit a binary data packet, the controller 28 may selectively activate the switch 25a during certain half-sine cycles of one of the phase lines 6, 7, 8 to cause a voltage decrease at the lighting fixture groups 46, 47, 48 during those half-sine cycles (thereby representing a binary "low") and not activate the switch 25a during certain other half-sine cycles (thereby representing a binary "high"). Also, for example, in alternative embodiments when switching the transformer 20 causes a voltage drop, in order to transmit a binary data packet, the controller 28 may selectively activate one or more switches during certain half-sine cycles to cause a voltage increase at the lighting fixture groups 46, 47, 48 during those half-sine cycles (thereby representing a binary "high") and not activate the one of the switches during other half-sine cycles (thereby representing a binary "low"). The switch(es) may optionally be activated between immediately successive zero-crossings of the selected one of the phase lines 6, 7, 8. In some embodiments additional switches may optionally be provided in the transformer 20. For example, in some embodiments the switch configuration of transformer 120 may be utilized in transformer 20, while maintaining the second winding 24 in series with the neutral line 5.

In some embodiments, the transformer 20 may be installed in a feeder pillar or street cabinet associated with a group of street lighting fixtures. In some embodiments the transformer 20 may be small enough to fit on a DIN mounting rail. The communications transformer 20 only needs to supply the power needed to lower the voltage of the first phase line 6 to which it is connected. For example, if the communications transformer 20 effectuates a one volt modulation and the first phase line 6 is two hundred and thirty volts, the power rating of the communications transformer 20 only needs to be $\frac{1}{230}$ of the rating of a power supply transformer for a two hundred and thirty volt line. Accordingly, in certain embodiments the communications transformer 20 may optionally be of a relatively small size.

In some embodiments, such as when the three-phase system is substantially balanced, the current flowing through the neutral line 5 will be zero or near zero. In such a balanced configuration, the transformer 20 will have little to no magnetization of the magnetic core. Accordingly, a relatively small transformer 20 can be utilized to provide communications to very large electrical loads connected between the neutral line 5 and phase lines 6, 7, 8. For example, assuming a 10 kVA string of street lights in each of lighting fixture groups 46, 47, 48 and a 1 to 2 Volt voltage drop/rise on half-sine cycles (or other sine cycle period) to transmit data packets as described herein, the transformer 20 could be configured to handle 40 Watts or less in a balanced configuration.

In some embodiments, a communications transformer may be provided that includes a primary winding and secondary winding. One or more taps may be provided, including one or more above normal taps and/or below normal taps, thereby enabling respective of increase and/or decrease in the turn ratio of the windings through electronic switching of the taps and a corresponding decrease and/or increase to the voltage differential between the neutral line 5 and phase lines 6, 7, 8 when the communications transformer is activated.

Referring to FIG. 2, another embodiment of a communications transformer 120 is illustrated coupled to the three-phase mains power supply 1. In some embodiments the configuration of FIG. 2 may be utilized when the neutral line 5 contains multiple connections to earth both before and after the installation location of the transformer 20 of FIG. 1. The communications transformer 120 may be downstream of a transformer of the three-phase mains power supply 1 that feeds a distribution panel. The communications transformer 120 includes a single transformer core with a first secondary winding 124a connected in series with the first phase line 6, a second secondary winding 124b connected in series with the second phase line 7, and a third secondary winding 124c connected in series with the third phase line 8. The communications transformer 120 also includes a primary winding 122 selectively coupled to the neutral line 5 and the phase line 6 via switches 125a, 125b, 125c, 125d. The primary winding 122 is also inductively coupled with the secondary windings 124a, 124b, 124c.

Coupled to the primary winding are electronically actuable switches 125a, 125b, 125c, 125d that may be selectively activated to alter the state of the communications transformer 120. When switches 125b and 125d are closed and switches 125a and 125c are open, the transformer 120 is switched on and a voltage is added to the phase lines 6, 7, 8. In some embodiments the added voltage may be approximately one volt. Adding a voltage to the phase lines 6, 7, 8 will result in an increased voltage being supplied to each of lighting fixture groups 46, 47, 48 as the voltage differential between each of phase lines 6, 7, 8 and neutral line is increased upon adding voltage to the phase lines 6, 7, 8. In some embodiments the transformer 120 may additionally or alternatively be configured to decrease the voltage on the phase lines 6, 7, 8. For example, when switches 125a and 125c are closed and switches 125b and 125d are open the voltage to the phase lines 6, 7, 8 is decreased. When switches 125b and 125c are closed and switches 125a and 125d are open are open no voltage is added to phase lines 6, 7, 8.

A controller 128 is also illustrated in FIG. 1 that is electrically coupled to the switches 125a, 125b, 125c, 125d. The electrical coupling between the controller 128 and the switches 125a, 125b, 125c, 125d is illustrated with dashed lines in FIG. 2. The controller 128 is also electrically coupled to the first phase line 6 and the neutral line 5. In some embodiments the controller 128 may alternatively be coupled to the neutral line and the second phase line 7 or the third phase line 8. The controller 128 selectively activates one or more of the switches 125a, 125b as described herein to encode a communications data packet in the output voltage supplied to each of lighting fixture groups 46, 47, 48.

In some embodiments, the transformer 120 may be installed in a feeder pillar or street cabinet associated with a group of street lighting fixtures. In some embodiments the transformer 120 may be small enough to fit on a DIN mounting rail. The communications transformer 120 only needs to supply the power needed to raise or lower the voltage of the phase lines 6, 7, 8 to which it is connected. For example, if the communications transformer 120 effectuates a one volt modulation and each phase line 6, 7, 8 is two hundred and thirty volts, the power rating of the communications transformer 20 only needs to be $3/230$ of the rating of a power supply transformer for a two hundred and thirty volt line. Accordingly, in certain embodiments the communications transformer 120 may optionally be of a relatively small size.

In some embodiments, a communications transformer may be provided that includes a primary winding and three secondary windings. One or more taps may be provided, including one or more above normal taps and/or below normal taps, thereby enabling respective of increase and/or decrease in the turn ratio of the windings through electronic switching of the taps and a corresponding decrease and/or increase to the voltage differential between the neutral line 5 and phase lines 6, 7, 8 when the communications transformer is activated.

Turning to FIG. 3, the voltage (or current) with respect to time for one cycle of a three-phase power system is illustrated. The illustrated cycle is 360° or $2\pi$ radians and is illustrated along the axis moving from left to right, with labels provided for 90°, 180°, 270°, and 360°. Plotted waveform A corresponds to the variation of an instantaneous voltage or current for a first phase line of the three-phase power system. Plotted waveform B corresponds to the variation of an instantaneous voltage or current for a second phase line of the three-phase power system. Plotted waveform C corresponds to the variation of an instantaneous voltage or current for a third phase line of the three-phase power system. As illustrated, the waveforms A, B, C have a phase separation of one-third cycle (120° or $(2\pi)/3$ radians).

Figure 4:
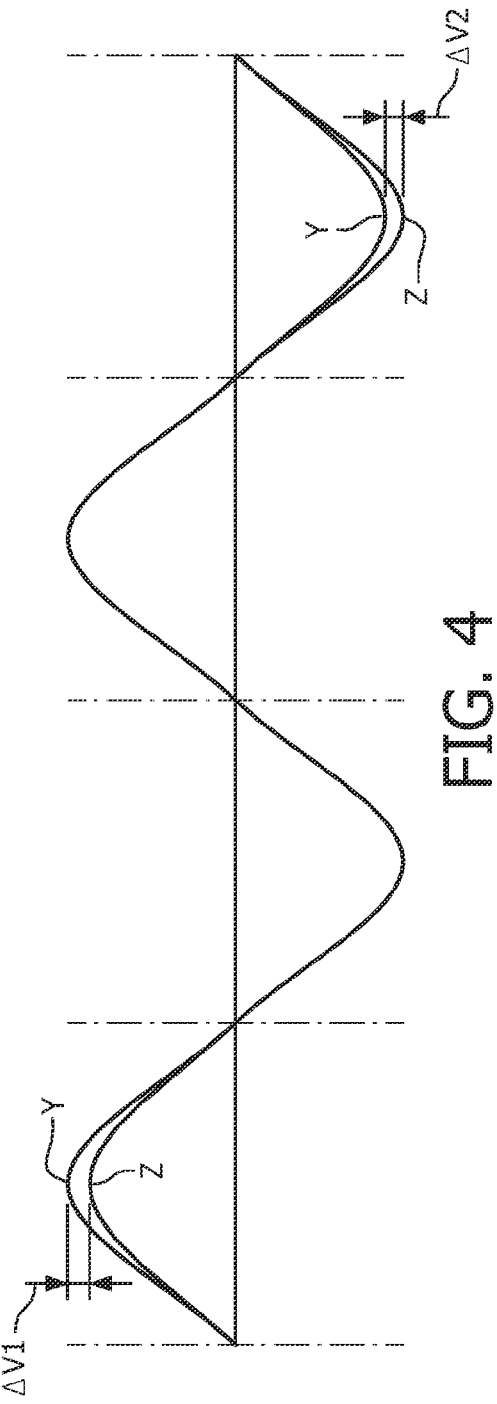
FIG. 4 illustrates first and second sinusoidal voltage waveforms for a single phase line of a three-phase power system over a portion of the cycles thereof.

Turning to FIG. 4, a first sinusoidal waveform Y and a second sinusoidal waveform Z are illustrated over two full sine cycles. Sinusoidal waveform Y is representative of a measured voltage differential between one phase line of a three-phase power system and a neutral line of the three-phase power system when no encoded data packets are being transmitted over the phase line or neutral line. For example, it may be representative of voltage differential between one of the phase lines 6, 7, 8 of FIG. 1 or 2 and the neutral line 5 when no encoded data packets are being transmitted by respective of transformers 20, 120. Sinusoidal waveform Z is representative of a measured voltage differential between one phase line of a three-phase power system and a neutral line of the three-phase power system when encoded data packets are being transmitted over the phase line or neutral line. For example, it may be representative of a voltage differential between one of the phase lines 6, 7, 8 of FIG. 1 or 2 and the neutral line 5 when encoded data packets are being transmitted via respective of transformers 20, 120.

Between the first two zero-crossings of the waveform Z (denoted by vertical dashed lines), a voltage drop $\Delta V1$ occurs relative to the waveform Y. In some embodiments the voltage drop $\Delta V1$ may be approximately one volt and may be caused via switching of a single switch. In other embodiments other voltage drops may occur and may optionally utilize more than one switch (e.g., may utilize multiple taps associated with one or both windings of the transformer). Between the second and third zero-crossings and the third and fourth zero-crossings, no voltage drop occurs, as can be seen by the waveform Y and waveform Z substantially mirroring one another. Between the fourth and fifth zero-crossings, a voltage drop $\Delta V2$ occurs relative to the waveform Y. In some embodiments the voltage drop $\Delta V2$ may be approximately one volt and may be caused via switching of a single switch of the transformer. Thus, the transmitted waveform B includes a "low" half-sine cycle, followed by two "high" half-sine cycles, then another "low" half-sine cycle. Additional encoded half-sine cycles may continue to be transmitted as desired.

In FIG. 4 the illustrated encoded data packet is implemented via switching of a transformer in phase with the phase of the illustrated one phase line of a three-phase power system. The encoded data packet will also be transmitted over the other two phase lines of a three-phase system, but will not be in phase with those two phase lines since they have a phase separation of one-third cycle from the illustrated data packet. Accordingly, the switching of the transformer will be 120° out of phase with the phases of the other two phase lines. The switching of the transformer 120° out of phase with the phases of the other two phase lines will still effectuate a voltage rise or drop in the two phase lines, but the magnitude of the voltage rise or drop may be decreased by approximately a factor of two relative to the voltage rise or drop in the in phase line. In some embodiments the amount of the voltage drop/rise caused by switching of the transformer may be increased to compensate for the decrease of the voltage rise or drop in the phase lines that are out of phase. For example, in some embodiments the amount of voltage drop/rise may be doubled. In some embodiments the same data packet may be transmitted multiple times and/or encoded with redundancy and/or error checking to enhance the likelihood of proper interpretation of the data packet on phase lines that are out of phase.

Figure 5:
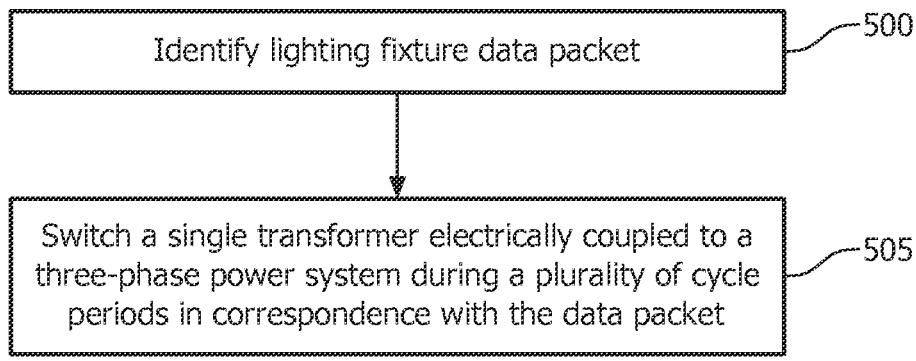
FIG. 5 illustrates an embodiment of transmitting a data packet via manipulation of a transformer.

Turning to FIG. 5, an embodiment of transmitting a data packet via manipulation of a transformer is illustrated. Other implementations may perform the steps in a different order, omit certain steps, and/or perform different and/or additional steps than those illustrated in FIG. 5. For convenience, aspects of FIG. 5 will be described with reference to one or more components that may perform the method. The components may include, for example, the controller 28 of FIG. 1 and/or the controller 128 of FIG. 2. Accordingly, for convenience, aspects of FIGS. 1 and 2 will be described in conjunction with FIG. 5.

At step 500, a lighting fixture data packet is identified. In some embodiments the lighting fixture data packet may be a data packet for implementing a dimming level at one or more lighting fixtures. For example, if the desired dimming level is a medium dimming level, that dimming level information may be incorporated into a lighting fixture data packet including a plurality of bytes. For example, the lighting fixture data packet may include twenty-four bits: an eight bit start code; an eight bit dimming code (incorporating medium dimming instructions); and an eight bit end code. The lighting fixture data packet may optionally employ one or more techniques to increase robustness. For example, in some embodiments eight-to-fourteen modulation (EFM) encoding may be utilized, such that the encoding of half-sine cycles is changed regularly. In other words, the encoding may ensure that no more than a few succeeding half-sines have the same voltage level, thereby making it easier for a controller of a lighting fixture to compare successive half-sine cycles to detect voltage levels. Also, for example, in some embodiments Reed-Solomon redundancy padding, CRC checking, a checksum, and/or other encoding may optionally be utilized in the data packet to increase robustness. For example, Reed-Solomon may be utilized when it is desired to add redundant information to a data packet with the intent to handle bit errors in transmission and/or reception of the data packet.

Also, for example, in some embodiments encoding methods for the data packet may be utilized where data frames with N bits are mapped to transmit frames with M bits, where M is greater than N. Such encoding methods may add redundant bits to the data packet by mapping the data packet to codes which all have only short sequences of 0's and 1's. Such encoding methods may provide one or more benefits. For example, such encoding methods may enable low frequency avoidance by only using transmit frames with short sequences of 0's and 1's. Also, for example, such encoding methods may enable error detection by identifying when a transmit code that is not being used is received since there are more transmit frame codes ($2^M$) compared to the number of data frames ($2^N$). Also, for example, such encoding methods may enable transient error correction by selecting the closest matching transmit code to correct a bit error. Also, for example, such encoding methods may enable burst error recovery by enabling identification of an amplitude change on the mains voltage when multiple (e.g., three or more) consecutive bits at the receiver side are interpreted as 0's or 1's. The receiver may, in response to interpreting multiple consecutive bits as 0's or 1's adjust time constants of the apparatus utilized to detect voltage averages to speed recovery from such a burst error situation. Also, for example, such encoding methods may enable synchronization by checking the error count on all M possible alignments of the incoming data and identifying the alignment with the lowest error count as the correct alignment.

As an example of an encoding method that may be utilized, 6 redundant bits could be added to 4 data bits to produce a set of 10-bit codes. The 16 possible values of 4 bits of data could be mapped to the set of 10-bit codes using an encoding scheme. For example, in the encoding scheme no 10-bit code may contain more than two consecutive 0's or 1's. Accordingly, a data packet transmitting such a code should not cause undesirable disturbances in the power supply to connected devices. The 10-bit codes may also be sufficiently different from one another to provide for correction of 2 bits by selecting the closest matching transmission code. The 10-bit codes may also provide for synchronization. Any two consecutively transmitted 10-bit codes will be decoded without errors only if the decoder is correctly synchronized. For example, if the controller tries to decode 10 bits from a received series of bits, but the ten bits under consideration comprise the last 5 bits from one 10-bit code and the first 5 bits from the next 10-bit code, the controller will detect an error because those bits will not correspond to one of the 10-bit codes in the set. In such a case the controller will keep 'moving' along the received series of bits, one bit at a time, until the ten bits under consideration are found to correspond to one of the 10-bit codes in the set. The controller will then be synchronized to the received bit stream.

One example of 16 possible values of 4 bits of data that could be mapped to the set of 10-bit codes using the encoding scheme is shown below.

0→155 (0010011011)
1→173 (0010101101)
2→182 (0010110110)
3→213 (0011010101)
4-299 (0100101011)
5→309 (0100110101)
6→9 333 (0101001101)
7→339 (0101010011)
8→358 (0101100110)
9→587 (1001001011)
10→598 (1001010110)

The lighting fixture data packet may optionally be determined based on input received from one or more sensors, network connection, memory, and/or other source. For example, in some embodiments a dimming level for groups of lighting fixtures 46, 47, 48 may be retrieved from a schedule stored in a memory associated with the controller 28 or 128. Also, for example, in some embodiments a dimming level may be determined, in whole or in part, via input from one or more sensors such as photo sensors (detecting e.g., ambient light level), proximity sensors (detecting e.g., presence of cars or pedestrians), and/or RF sensors (detecting e.g., signals sent from adjacent lighting fixture networks, signals from a central control system, and/or signals from a vehicle). Although a dimming level is discussed in some aspects of the description of the method of FIG. 5, one of skill in the art, having had the benefit of the present disclosure, will recognize and appreciate that in alternative embodiments additional or alternative aspects of a lighting fixture may be controlled. For example, in some embodiments color output of a LED-based light source of the lighting fixture may be controlled and/or which of a plurality of light sources of a lighting fixture are activated may be controlled. Control information may be directed to one or more addressable lighting fixtures by encoding address data therein and/or may be directed to all lighting fixtures in a group.

At step 505, a single transformer electrically coupled to a three phase power system is switched during a plurality of cycle periods in correspondence with the data packet. For example, the transformer 20 may be switched during a plurality of half-sine cycles in correspondence with the data packet. In some embodiments the transformer may be switched via actuation of one or more switches. For example, in some embodiments appropriate of the switches 125a, 125b, 125c, 125d of transformer 120 may be actuated during half-sine cycles that are to correspond with a data high and may not be actuated during half-sine cycles that are to correspond with a data low. Optionally, the data packet may be encoded on a plurality of continuous cycles. In other embodiments one or more non-encoded cycles may be interposed within the data packet.

In some embodiments the voltage supplied by the three phase power system may be transmitted un-encoded for a period of time and the transformer may then again be switched during a plurality of cycles in correspondence with the data packet. The data packet may be continuously transmitted (optionally after a period of time) in certain embodiments where lighting fixtures will revert back to a previous or default state unless data packets are retransmitted. For example, in some embodiments the dimming level will be transmitted approximately every five minutes. If a lighting fixture does not receive a renewed dimming level instruction within six minutes of the most recent dimming level instruction, then that lighting fixture may revert back to a previous or default state (e.g., utilizing a preloaded schedule) until another dimming level instruction is received.

In some embodiments the data packet may be encoded only on either a plurality of positive half cycles or a plurality of negative half cycles. For example, in some embodiments one of the switches of the transformers 20, 120 may be actuated during positive half-sine cycles that are to correspond with a data high and may not be actuated during positive half-sine cycles that are to correspond with a data low. In such embodiments the switches will not be actuated in accordance with the data packet during negative half-sine cycles. In such embodiments the negative half-sine cycles may not carry any data or may instead carry a separate data packet. For example, in some embodiments the data packet may be encoded only on the positive half-sine cycles and a second data packet may be encoded only on the negative half-sine cycles.

The negative half-sine cycles and the positive half-sine cycles may be seen as two completely independent communication channels. Synchronization, packet decoding, redundancy coding and command coding (timing and/or state of the channel), and/or data payload may be handled separately between the independent communication channels. Also, the two independent communication channels may optionally be in two different states. For example, the positive half cycle channel may be synchronized and utilized for decoding and executing commands, while the negative channel is in a state where it is not yet utilized for identifying false and true amplitude levels. In some embodiments encoding a data packet on only one of a plurality of positive half cycles or a plurality of negative half cycles may make the data communication more robust to noise caused by an asymmetric load. For instance, a DC load that utilizes a diode to reduce power may only carry current in one of the positive or negative half cycles (dependent on diode polarization), which may cause asymmetric amplitude variation when the DC load is in a reduced power state. If such a load reduces the positive half cycles by 5 volts (via resistive loss) and the negative half cycles by 0 volts, then a data packet sent on both the positive half cycles and the negative half cycles that utilizes a voltage drop of 2 volts to transmit data will be corrupted by such asymmetric amplitude variation. If, however, the data packet is sent only on the positive half cycles or only on the negative half cycles and utilizes a voltage drop of 2 volts, the data packet will not be corrupted.

Figure 6:
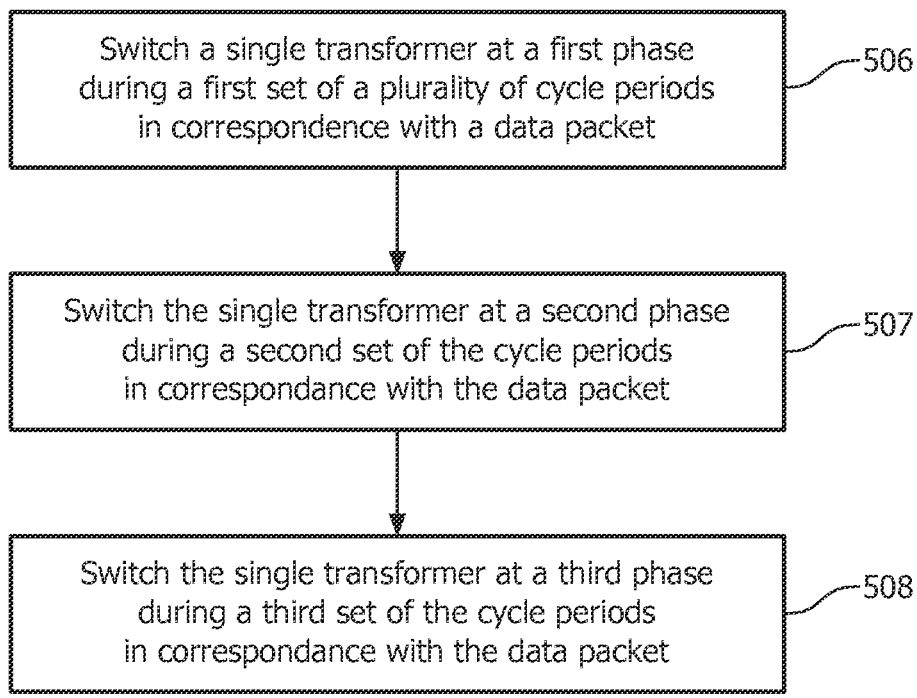
FIG. 6 illustrates an embodiment of shifting the phase of the switching of a single transformer electrically coupled to a three-phase power system.

Turning to FIG. 6, an embodiment of shifting the phase of the switching of a single transformer electrically coupled to a three-phase power system is illustrated. Other implementations may perform the steps in a different order, omit certain steps, and/or perform different and/or additional steps than those illustrated in FIG. 6. For convenience, aspects of FIG. 6 will be described with reference to one or more components that may perform the method. The components may include, for example, the controller 28 of FIG. 1 and/or the controller 128 of FIG. 2. Accordingly, for convenience, aspects of FIGS. 1 and 2 will be described in conjunction with FIG. 6.

In some embodiments steps 506-508 may be performed when step 505 of FIG. 5 is performed. Generally speaking, steps 506-508 utilize switching of a transformer to resend a given data packet at least once during each of three different switching phases of the transformer. In some embodiments the phase difference between each of the three different phases may be approximately 120°. In some embodiments each of the three different phases will correspond to a phase of one of three phase lines of a three-phase power system. Accordingly, in such embodiments the data packet may be transmitted at least once in phase with the first phase line, transmitted at least once in phase with the second phase line, and transmitted at least once in phase with the third phase line.

In some embodiments only certain data packets may be transmitted utilizing the steps of FIG. 6. In some embodiments the steps of FIG. 6 are not implemented in switching of a single transformer to provide a data packet over multiple lines of a three-phase system. As discussed herein, the switching of the transformer out of phase with the phase of a given phase line will still effectuate a voltage rise or drop in the given phase line, but the magnitude of the voltage rise or drop in the given phase line will be decreased relative to the voltage rise or drop in the in-phase line. In some embodiments the amount of the voltage drop/rise caused by switching of the transformer may be increased to compensate for the decrease of the voltage rise or drop in the phase lines that are out of phase. In some embodiments the same data packet may be transmitted multiple times and/or encoded with redundancy and/or error checking to enhance the likelihood of interpretation of the data packet on phase lines that are out of phase.

At step 506 the single transformer is switched at a first phase during a first set of a plurality of cycle periods in correspondence with a data packet. In some embodiments the first phase may substantially correspond with a phase of a first phase line of a three-phase power system. For example, the first phase may substantially correspond with the phase of the first phase line 6. Switching of the single transformer at a first phase that corresponds with the phase of the first phase line 6 will cause a voltage rise/drop at the first lighting fixture group 46 that is in correspondence with the data packet and that is substantially equal to the voltage rise/drop created by the single transformer.

At step 507 the single transformer is switched at a second phase during a second set of the plurality of cycle periods in correspondence with the data packet. In some embodiments the second phase may substantially correspond with a phase of a second phase line of a three-phase power system. For example, the second phase may substantially correspond with the phase of the second phase line 7. Switching of the single transformer at a second phase that corresponds with the phase of the second phase line 7 will cause a voltage rise/drop at the second lighting fixture group 47 that is in correspondence with the data packet and that is substantially equal to the voltage rise/drop created by the single transformer.

At step 508 the single transformer is switched at a third phase during a third set of the plurality of cycle periods in correspondence with the data packet. In some embodiments the third phase may substantially correspond with a phase of a third phase line of a three-phase power system. For example, the third phase may substantially correspond with the phase of the third phase line 8. Switching of the single transformer at a third phase that corresponds with the phase of the third phase line 8 will cause a voltage rise/drop at the third lighting fixture group 48 that is in correspondence with the data packet and that is substantially equal to the voltage rise/drop created by the single transformer. In some embodiments one of steps 506, 507, and 508 may be omitted and a given data packet be presented at least once during each of two different switching phases of the transformer.

Although the same data packet is described as being transmitted at the three switching phases of the switch, in some embodiments different data packets may be transmitted during the different switching phases. This may enable multiple channels of communication with a single transformer. For example, data packets transmitted in phase with a respective phase line may only be acted upon by apparatus that are in that phase line. For example, a controller of a lighting fixture may only act on data packets that are in phase with the respective phase line of a three-phase lighting system that is connected thereto.

Figure 7:
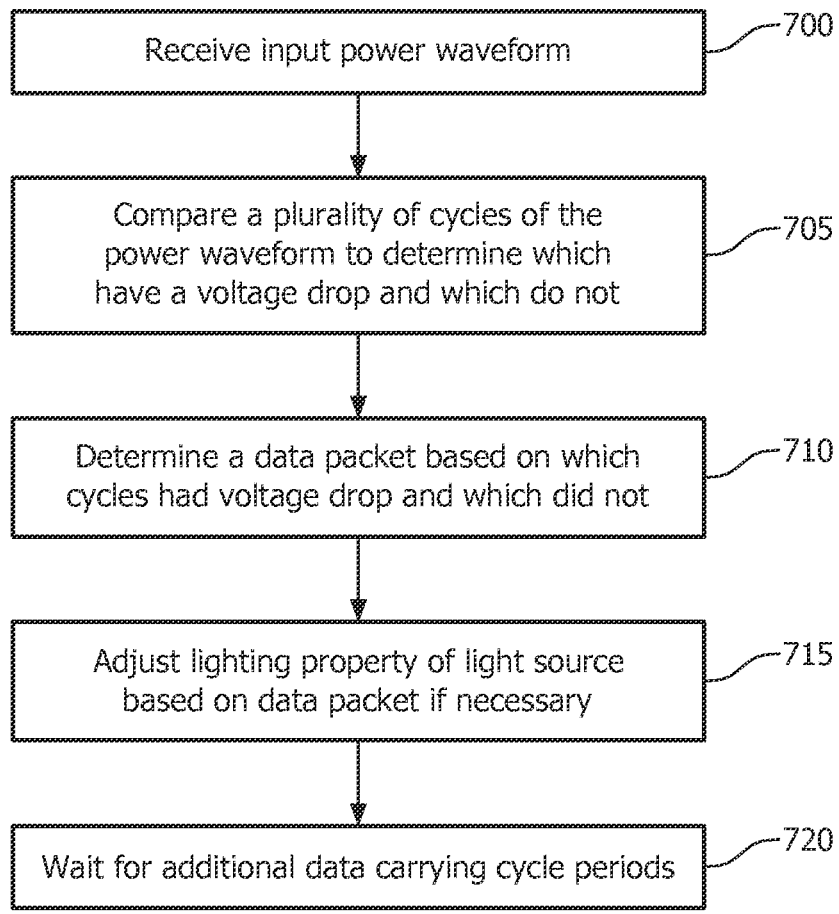
FIG. 7 illustrates an embodiment of analyzing an input power waveform and determining data packet information based on the analysis of the input power waveform.

Turning to FIG. 7, an embodiment of a method of analyzing an input power waveform and determining data packet information based on the analysis of the input power waveform. Other implementations may perform the steps in a different order, omit certain steps, and/or perform different and/or additional steps than those illustrated in FIG. 7. For convenience, aspects of FIG. 7 will be described with reference to one or more components that may perform the method. The components may include, for example, the controller 54 of FIG. 8. Accordingly, for convenience, aspects of FIG. 8 will be described in conjunction with FIG. 7.

The method includes the step 700 of receiving an input power waveform. In some embodiments the input power waveform may be oversampled. In some embodiments the controller 54 may receive the input power waveform. The input power waveform may be received over a single phase line and a neutral line of a three-phase power system. In some embodiments the input power waveform may optionally first be altered by an analog to digital converter prior to the receiving step.

At step 705, a plurality of cycles of the power waveform are compared to determine which of those cycles have a voltage drop and which do not. For example, in some embodiments each successive half-sine cycle will be analyzed to determine whether it has a voltage drop or no voltage drop. Also, for example, in some embodiments every fourth half-sine cycle will be analyzed to determine whether it has a voltage drop or no voltage drop. In other embodiments a plurality of half-sine cycles are compared to determine which of those cycles have a voltage rise and which do not. In some embodiments the controller 54 may compare the plurality of cycles of the power waveform to determine which of those cycles have a voltage drop and which do not.

Also, for example, in some embodiments only each positive half-sine cycle will be analyzed to determine whether it has a voltage drop or no voltage drop or only each negative half-sine cycle will be analyzed to determine whether it has a voltage drop or no voltage drop. For example, in some embodiments the data packet may be encoded only on the positive half-sine cycles and only the positive half-sine cycles analyzed to determine the data packet. Also, for example, in some embodiments a first data packet may be encoded only on the positive half-sine cycles and only the positive half-sine cycles analyzed to determine the first data packet. A second data packet may be encoded only on the negative half-sine cycles and only the negative half-sine cycles analyzed to determine the second data packet. The negative half-sine cycles and the positive half-sine cycles may be seen as two completely independent communication channels. Synchronization, packet decoding, redundancy coding and command coding (timing and/or state of the channel), and/or data payload may be handled completely separately between the independent communication channels. Also, the two independent communication channels may optionally be in two completely different states.

In some embodiments a low pass filter and/or other apparatus may be utilized to average the received input power waveform and the average may be utilized in determination of whether a half cycle has a voltage drop or a voltage rise. An unwanted sudden change of amplitude in the AC mains voltage will slowly increase or decrease this average, which may cause a temporary error in the determination of whether a half cycle has a voltage drop or a voltage rise. Such errors would persist until the low pass filter has adjusted to the new normal average value. In some implementations the low pass filter may be adjusted to speed-up adjustment of the normal average value, in response to detecting a sudden change of amplitude in the AC mains voltage. Such a sudden change in amplitude of the AC mains may be identified when multiple sequential bits at the receiver side are interpreted as 0's or 1's when encoding methods have been utilized to map the data packet to codes which all have only short sequences of 0's and 1's. The receiver may, in response to interpreting multiple sequential bits as 0's or 1's adjust time constants of the apparatus utilized to detect voltage averages to speed recovery from such a burst error.

At step 710, the transmitted data packet is determined based on which of the cycles had a voltage drop and which did not. For example, the voltage drop packets may be interpreted as digital lows and the non-voltage drop packets may be interpreted as digital highs. Optionally, the received packets may be decoded and/or corrected utilizing one or more algorithm such as Reed-Solomon, CRC checking, checksum, and/or forward error correction. For example, if the data packet was transmitted utilizing Reed-Solomon encoding it may be decoded utilizing a Reed-Solomon algorithm.

At step 715, a lighting property of at least one light source may be adjusted based on the determined data packet at step 710, if necessary. For example, the data packet may include one or more bits that are indicative of a dimming level. If such a dimming level differs from the current dimming level, then the dimming level of the light source 56 may be adjusted via ballast 52.

At step 720, the controller 54 may optionally wait a period of time for additional data carrying half-sine cycles to be transmitted. For example, the data packet may be continuously transmitted (optionally after a period of time) in certain embodiments and the lighting fixtures will revert back to a previous or default state unless data packets are received within a certain time period. For example, in some embodiments the dimming level will be transmitted approximately every minute. If a lighting fixture does not receive a renewed dimming level instruction within a minute of the most recent dimming level instruction, then controller 54 may cause the ballast 52 to gradually revert to driving the light source 56 at a full output power. Optionally, in some embodiments full output power may be the default when no dim signal is detected via the data packet. In combination with optional cabinet level switching of the mains power during the day, such a solution may be very robust to error situations with data packet transmission. Also, in some alternative embodiments other lighting controls may additionally or alternatively operate the lighting fixture if a lighting fixture does not receive a renewed dimming level instruction within a certain amount of time or otherwise loses proper communication with output from a transformer. For example, the lighting fixture may by default be controlled in response to, inter alia, an output of a daylight sensor of the lighting fixture.

Although aspects of the method of FIG. 7 are discussed in relation to a dimming level, one of skill in the art, having had the benefit of the present disclosure will recognize and appreciate that in alternative embodiments additional or alternative aspects of a lighting fixture may be controlled. For example, in some embodiments color output of the lighting fixture may be controlled and/or which light sources of a lighting fixture are activated may be controlled.

Although aspects of methods and apparatus described herein discuss manipulation of voltage during a plurality of half-sine cycles, one of skill in the art, having had the benefit of the present disclosure will recognize and appreciate that in alternative embodiments additional or alternative periods of a sine cycle may be utilized. For example, in some embodiments manipulation may occur over quarter-sine cycles, three-quarter-sine cycles, and/or more than one sine cycle (e.g. one-and-a-half-sine cycles). For example, in some embodiments manipulation may alternatingly occur over half-sine cycles and three-quarter-sine cycles. Controller 28 and/or 128 may properly be configured to transmit any such alternative sine-cycle periods and controller 54 may be properly configured to receive and analyze any such alternative sine-cycle periods. Moreover, any phase shifting of the switching phase of the transformer as described herein (e.g., with respect to FIG. 6), may optionally be configured for any such alternative sine-cycle periods.

Figure 8:
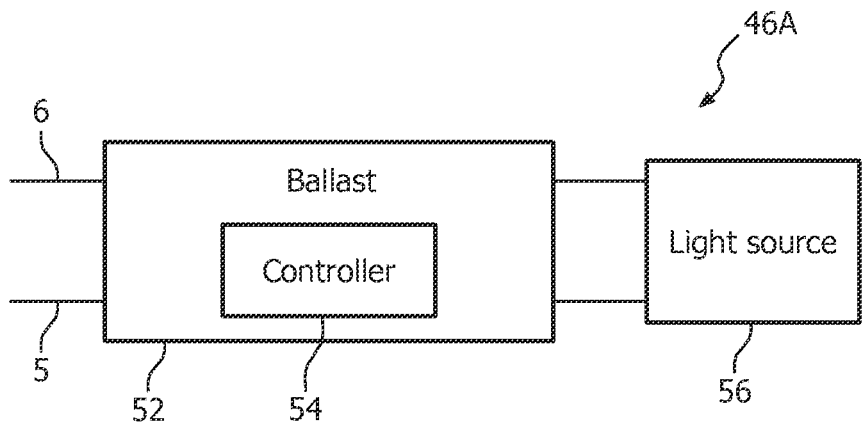
FIG. 8 illustrates an embodiment of a lighting fixture that may be included in one or more of the lighting fixtures of the groups of lighting fixtures of FIG. 1 or 2.

FIG. 8 illustrates an embodiment of a lighting fixture 46A of lighting fixture group 46 that is electrically coupled between first phase line 6 and neutral line 5 of FIGS. 1 and 2. Lighting fixture groups 47 and/or 48 may optionally include one or more similar lighting fixtures. The lighting fixture 46A includes a ballast 52 that receives the first phase line 6 and neutral line 5. The ballast 52 includes a controller 54 that monitors the voltage differential between the first phase line 6 and neutral line 5. In some embodiments an analog to digital converter may be interposed between the controller 54 and the first phase line 6 and neutral line 5. The controller 54 may optionally oversample input received via the analog to digital converter to achieve an accuracy that is greater than the resolution that can be achieved by the analog to digital converter alone. The controller 54 may then compare cycles (e.g., half-sine cycles) to detect which cycles were affected by a voltage drop or voltage rise and which ones were not. For example, if waveform Z of FIG. 3 were transmitted by the first phase line 6 and neutral line 5, the controller 54 could determine that a "low" half-sine cycle, followed by two "high" half-sine cycles, then another "low" half-sine cycle were present in the received input. The controller 54 may control one or more aspects of the lighting fixture 46A based on received encoded power. For example, if dimming level encoded data is received, the controller 54 may cause ballast 52 to operate the light source 56 at the transmitted dimming level.

In some embodiments, the controller 54 and analog to digital converter may be similar to hardware currently utilized in lamp ballasts (e.g., to measure the voltage received at the ballasts). In some versions of those embodiments updated software may be installed on an existing controller 54. In other versions of those embodiments the controller 54 and/or ballast may be new. Utilization of modified hardware that is similar to hardware currently utilized in lamp drivers may enable easy incorporation of the modified hardware in existing fixtures.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited. Also, reference numerals appearing in the claims in parentheses, if any, are provided merely for convenience and should not be construed limiting the claims in any way.

In the claims, as well as in the specification above, all transitional phrases such as "comprising," "including," "carrying," "having," "containing," and the like are to be understood to be open-ended, i.e., to mean including but not limited to. Only the transitional phrases "consisting of" and "consisting essentially of" shall be closed or semi-closed transitional phrases, respectively.

What is claimed is:

1. A method of transmitting a data packet to a lighting fixture network over a three-phase power system via manipulation of a single transformer coupled to the three-phase power system, comprising:
    identifying a lighting fixture data packet, said lighting fixture data packet based on data indicative of appropriate lighting fixture settings for one or more lighting fixtures of a lighting fixture network;
    switching a single transformer electrically coupled to a three-phase power system during a plurality of cycle periods, said three-phase power system including a first phase line, a second phase line, a third phase line, and a neutral line; and
    wherein switching said single transformer causes one of a voltage drop and a voltage rise measurable between each of: said first phase line and said neutral line, said second phase line and said neutral line, and said third phase line and said neutral line;
    wherein switching said single transformer is done in correspondence with said data packet such that said at least one of said voltage drop and said voltage rise correspond to said data packet.

2. The method of claim 1, wherein switching of said transformer occurs at a first phase during a first set of said cycle periods and occurs at a second phase during a second set of said cycle periods.

3. The method of claim 2, wherein said transformer is connected in series with said neutral line of said three-phase power system.

4. The method of claim 2, wherein said transformer includes:
    a first secondary winding connected in series with said first phase line;
    a second secondary winding connected in series with said second phase line; and
    a third secondary winding connected in series with said third phase line.

5. The method of claim 2, wherein said first phase and said second phase have a phase difference of approximately one-hundred and twenty degrees.

6. The method of claim 5, wherein switching of said transformer occurs at a third phase during a third set of said cycle periods and wherein said second phase and said third phase have a phase difference of approximately one-hundred and twenty degrees.

7. The method of claim 1, wherein said transformer is connected in series with said neutral line of said three-phase power system.

8. The method of claim 1, wherein said transformer includes:
    a first secondary winding connected in series with said first phase line;
    a second secondary winding connected in series with said second phase line; and
    a third secondary winding connected in series with said third phase line.

9. The method of claim 1, wherein a sum of current through the transformer is substantially zero.

10. The method of claim 1, wherein said data indicative of appropriate lighting fixture settings is stored in a memory.

11. The method of claim 1, wherein said data indicative of appropriate lighting fixture settings is based on data received from at least one sensor.

12. The method of claim 1, wherein said at least one of said voltage drop and said voltage rise is less than four volts.

13. The method of claim 1, wherein said cycle periods consist of half-sine cycle periods.

14. A method of determining data packet information transmitted over a three-phase power system and controlling a lighting fixture based on the data packet information, comprising:
    receiving, at a first controller, a first input power waveform over a first phase line and a neutral line of a three-phase power system;
    comparing, at said first controller, a voltage level of a plurality of first sine cycle periods of said first input power waveform;
    determining, at said first controller, an incoming data packet based on which of said first sine cycle periods have a reduced voltage level and which have a non-reduced voltage level;
    controlling, via said first controller, at least one aspect of a first lighting fixture based on said incoming data packet received over said first input power waveform, said first lighting fixture electrically powered by said first input power waveform;
    receiving, at a second controller, a second input power waveform over a second phase line and said neutral line of the three phase power system; and
    comparing, at said second controller, a voltage level of a plurality of second sine cycle periods of said second input power waveform, wherein the receiving of said second sine cycle periods of said second input power waveform overlaps in time with the receiving of said first sine cycle periods of said first input power waveform;
    wherein the difference between said reduced voltage level and said non-reduced voltage level in said second sine cycle periods is approximately half of the difference between said reduced voltage level and said non-reduced voltage level in said first sine cycle periods.

15. The method of claim 14, wherein the difference between said reduced voltage level and said non-reduced voltage level in said second sine cycle periods is less than two volts.

16. The method of claim 14, wherein a dimming level of said first lighting fixture and said second lighting fixture is controlled based on said incoming data packet.

17. The method of claim 14, wherein said sine cycle periods include half-sine cycles.

18. The method of claim 14, further comprising:
comparing, at said first controller, a voltage level of a plurality of additional first sine cycle periods of said first input power waveform;
comparing, at said second controller, a voltage level of a plurality of additional second sine cycle periods of said second input power waveform, wherein the receiving of said additional second sine cycle periods of said second input power waveform overlaps in time with the receiving of said additional first sine cycle periods of said first input power waveform;
determining, at said second controller, said incoming data packet based on which of said additional second sine cycle periods have a reduced voltage level and which have a non-reduced voltage level; and
controlling, via said second controller, at least one aspect of a second lighting fixture based on said incoming data packet received over said second input power waveform, said second lighting fixture electrically powered by said second input power waveform;
wherein the difference between said reduced voltage level and said non-reduced voltage level in said additional first sine cycle periods is approximately half of the difference between said reduced voltage level and said non-reduced voltage level in said additional second sine cycle periods.

19. The method of claim 14, further comprising determining, at said second controller, said incoming data packet based on which of said second sine cycle periods have a reduced voltage level and which have a non-reduced voltage level; and controlling, via said second controller, at least one aspect of a second lighting fixture based on said incoming data packet received over said second input power waveform, said second lighting fixture electrically powered by said second input power waveform.

20. A method of implementing a communication system in a three-phase power system, comprising:
electrically coupling a single transformer to at least one line of a three-phase power system, said three-phase power system including a neutral line and three phase lines, at least one phase line of said three phase lines feeding a lighting fixture network, said single transformer selectively causing a voltage alteration recognizable in connections with each of said three phase lines of said three-phase power system during a plurality of sine cycle periods in correspondence with an informational data packet.

21. The method of claim 20, further comprising:
implementing software in a controller of a ballast in at least one lighting fixture of said lighting fixture network, said ballast being coupled to said one phase line and said neutral;
wherein said controller monitors voltage over said one phase line and said neutral;
wherein said software determines an incoming data packet based on which of said sine cycle periods have said voltage alteration; and
wherein said controller controls one or more aspect of said lighting fixture based on said incoming data packet.

22. The method of claim 20, wherein said single transformer is connected in series with said neutral line of said three-phase power system.

23. The method of claim 20, wherein said single transformer includes:
a first secondary winding connected in series with said first phase line;
a second secondary winding connected in series with said second phase line; and
a third secondary winding connected in series with said third phase line.

\* \* \* \* \*